(12) United States Patent
Stein et al.

(10) Patent No.: US 7,177,891 B2
(45) Date of Patent: Feb. 13, 2007

(54) COMPACT GALOIS FIELD MULTIPLIER ENGINE

(75) Inventors: Yosef Stein, Sharon, MA (US); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 581 days.

(21) Appl. No.: 10/395,620

(22) Filed: Mar. 24, 2003

(65) Prior Publication Data

US 2004/0078409 A1    Apr. 22, 2004

Related U.S. Application Data

(60) Provisional application No. 60/417,384, filed on Oct. 9, 2002.

(51) Int. Cl.
  *G06F 7/72*   (2006.01)
(52) U.S. Cl. ....................................... 708/492
(58) Field of Classification Search ................. 708/492
  See application file for complete search history.

(56) References Cited

U.S. PATENT DOCUMENTS

| | | | |
|---|---|---|---|
| 4,251,875 A | 2/1981 | Marver et al. |
| 4,847,801 A | 7/1989 | Tong |
| 4,852,098 A | 7/1989 | Brechard et al. |
| 4,918,638 A | 4/1990 | Matsumoto et al. |
| 5,046,037 A | 9/1991 | Cognault et al. |
| 5,095,525 A | 3/1992 | Almgren et al. |
| 5,214,763 A | 5/1993 | Blaner et al. |
| 5,379,243 A | 1/1995 | Greenberger et al. |
| 5,386,523 A | 1/1995 | Crook et al. |
| 5,446,850 A | 8/1995 | Jeremiah et al. |
| 5,689,452 A | 11/1997 | Cameron |
| 5,754,563 A | 5/1998 | White |
| 5,768,168 A | 6/1998 | Im |
| 5,832,290 A | 11/1998 | Gostin et al. |
| 5,996,057 A | 11/1999 | Scales, III et al. |
| 5,999,959 A | 12/1999 | Weng et al. |

(Continued)

FOREIGN PATENT DOCUMENTS

| EP | 1071008 A | 1/2001 |
|---|---|---|
| EP | 1 246 389 A1 | 10/2002 |

OTHER PUBLICATIONS

U.S. Appl. No. 10/440,330, filed May 16, 2003, Stein et al.

(Continued)

*Primary Examiner*—D. H. Malzahn
(74) *Attorney, Agent, or Firm*—Landiorio & Teska

(57) ABSTRACT

A compact Galois field parallel multiplier engine includes a multiplier circuit for multiplying together two polynomials with coefficients over a Galois field to obtain their product; a Galois field linear transformer circuit has a multiply input from the multiplier circuit for predicting the modulo remainder of the polynomial product for an irreducible polynomial; first and second polynomial inputs; the Galois field linear transformer circuit may include a plurality of cells configured in a matrix section and a unity matrix section wherein the unity matrix section cells represent the prediction of the remainder when the output of the multiplier circuit is a polynomial with a power less than the power of the irreducible polynomial.

56 Claims, 13 Drawing Sheets

U.S. PATENT DOCUMENTS

| | | | |
|---|---|---|---|
| 6,049,815 | A | 4/2000 | Lambert et al. |
| 6,175,945 | B1 | 1/2001 | Shigeru |
| 6,199,086 | B1 | 3/2001 | Dworkin et al. |
| 6,199,087 | B1 | 3/2001 | Blake et al. |
| 6,223,320 | B1 | 4/2001 | Dubey et al. |
| 6,230,179 | B1 | 5/2001 | Dworkin et al. |
| 6,246,768 | B1 | 6/2001 | Kim |
| 6,349,318 | B1 | 2/2002 | Vanstone et al. |
| 6,434,662 | B1 | 8/2002 | Greene et al. |
| 6,587,864 | B2 | 7/2003 | Stein et al. |

OTHER PUBLICATIONS

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

Máire McLoone and J.V. McCanny, *High Performance Single-Chip FPGA Rijndael Algorithm Implementations*, CHES 2001 PROC, LNCS 2162, 65-76 (ç.K. Koç et al. eds. May 16, 2001).

elixent, *Changing the Electronic Landscape* (2001) <http://www.elixent.com> (elixent—Bristol, UK).

elixent Application Note *JPEG Codec* (Dec. 9, 2002) <http://www.elixent.com/assets/jpeg-coder.pdf> (elixent—Bristol, UK).

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

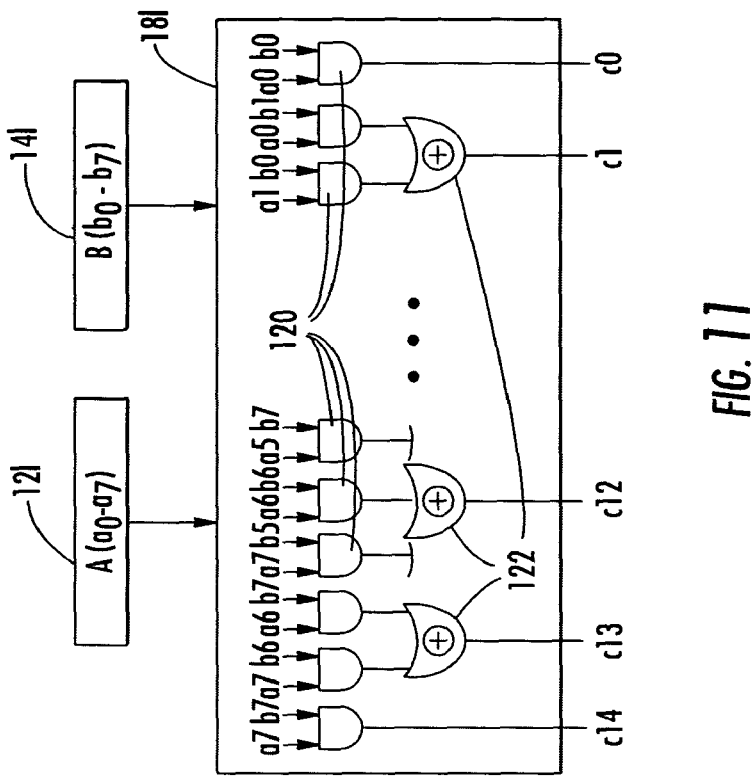

FIG. 11

OUTPUT TO GFU
$c14 = a7*b7$
$c13 = a7*b6 \oplus a6*b7$
$c12 = a7*b5 \oplus a6*b6 \oplus a5*b7$
$c11 = a7*b4 \oplus a6*b5 \oplus a5*b6 \oplus a4*b7$
$c10 = a7*b3 \oplus a6*b4 \oplus a5*b5 \oplus a4*b6 \oplus a3*b7$
$c9 = a7*b2 \oplus a6*b3 \oplus a5*b4 \oplus a4*b5 \oplus a3*b6 \oplus a2*b7$
$c8 = a7*b1 \oplus a6*b2 \oplus a5*b3 \oplus a4*b4 \oplus a3*b5 \oplus a2*b6 \oplus a1*b7$
$c7 = a7*b0 \oplus a6*b1 \oplus a5*b2 \oplus a4*b3 \oplus a3*b4 \oplus a2*b5 \oplus a1*b6 \oplus a0*b7$
$c6 = a6*b0 \oplus a5*b1 \oplus a4*b2 \oplus a3*b3 \oplus a2*b4 \oplus a1*b5 \oplus a0*b6$
$c5 = a5*b0 \oplus a4*b1 \oplus a3*b2 \oplus a2*b3 \oplus a1*b4 \oplus a0*b5$
$c4 = a4*b0 \oplus a3*b1 \oplus a2*b2 \oplus a1*b3 \oplus a0*b4$
$c3 = a3*b0 \oplus a2*b1 \oplus a1*b2 \oplus a0*b3$
$c2 = a2*b0 \oplus a1*b1 \oplus a0*b2$
$c1 = a1*b0 \oplus a0*b1$
$c0 = a0*b0$

FIG. 12

COMPACT GALOIS FIELD MULTIPLIER ENGINE

RELATED APPLICATIONS

This application claims priority of U.S. Provisional Application Ser. No. 60/417,384 to Stein et al. entitled A COMPACT GALOIS FIELD MULTIPLIER, filed Oct. 9, 2002.

FIELD OF THE INVENTION

This invention relates to a compact Galois field multiplier engine, and more particularly to one which can multiply, multiply-add, and multiply-accumulate over a Galois field.

BACKGROUND OF THE INVENTION

Multiplication of polynomials with coefficients in Galois fields (GF) is widely used in communication systems for Reed Solomon (RS) coding and in advanced encryption standards (AES). In some, the basic Galois fields multiplication is not enough and a more advanced Galois fields operation like Galois fields multiply and accumulate (GF-MAC) or Galois fields multiply and add (GF_MPA) are needed. Galois field multiplication is difficult and time consuming for traditional digital signal processors (DSP) to perform. DSP's are optimized for finite impulse response (FIR) filtering and other multiply accumulate (MAC) intensive operations, but do not efficiently process Galois field types of operations. One approach uses a straight forward polynomial multiplication and division over the Galois field using linear feedback shift registers (LFSR's) which process one bit at a time. This is a very slow process. For example, in broadband communication for AES types of applications, where the bit rate is up to 40 megabits per second, there will be up to 5 million GF multiplications per second (GF-MPS) and each multiplication may require many e.g. 60–100 operations. Another approach uses look-up tables to perform the Galois field multiplication. Typically, this approach requires 10–20 or more cycles which for 5 GF-MPS results in a somewhat lower but still very large number of operations e.g. 20×5=100 MIPS or more. Reed-Solomon codes have been widely accepted as the preferred error control coding scheme for broadband networks. A programmable implementation of a Reed-Solomon encoder and decoder is an attractive solution as it offers the system designer the unique flexibility to trade-off the data bandwidth and the error correcting capability that is desired based on the condition of the channel. The first step in Reed-Solomon decoding is the computing of the syndromes. The syndromes can be formally defined as Si=R mod G where i=(0,1 . . . 15). The received code word may be expressed in polynomial form as $R_i = r_o X^{N-1} + r_1 X^{N-2} + \ldots r_{N-1}$ where the length of the received word is N. It can be seen that computing the syndrome amounts to polynomial evaluation over Galois field at the roots as defined by the $j'^{th}$ power of the $i'^{th}$ root of the generator polynomial. For each received word in the Reed-Solomon Algorithm there are sixteen syndromes to be calculated which raise the operations by a factor of sixteen to 1.6 billion-operations per second (BOPS)-not practical on current microprocessors. Using the straight forward multiplication instead of the look-up tables raises the operation rate to 6.4 BOPS. The need for Galois field multiplications is increasing dramatically with the expansion of the communications field and the imposition of encryption requirements on the communication data. This further complicates the matter because each domain-error checking, encryption- needs Galois field multiplication over a different Galois field which requires different sets of look-up tables. A recent improvement in Galois field multiplier systems or engines provides faster operation and reduced storage requirements but still faster, lower power and smaller designs are demanded.

BRIEF SUMMARY OF THE INVENTION

It is therefore an object of this invention to provide a new and improved compact Galois field multiplier engine.

It is a further object of this invention to provide such a new and improved compact Galois field multiplier engine which further reduces the size and propagation path resulting in a smaller, simpler and faster design.

It is a further object of this invention to provide such a new and improved compact Galois field multiplier engine which further reduces the amount of storage required.

It is a further object of this invention to provide such a new and improved compact Galois field multiplier engine which reduces the required number of external busses and uses less resources, such as registers, of associated DSP.

It is a further object of this invention to provide such a new and improved compact Galois field multiplier engine, which can reduce the required time to reconfigure for a new polynomial.

It is a further object of this invention to provide such a new and improved compact Galois field multiplier engine which provides more functionality in that it not only performs a one cycle multiplication but also multiply-add and multiply-accumulate operations.

The invention results from the realization that a compact Galois field multiplier engine capable of obtaining one or more of the Galois field multiply, multiply-add and multiply-accumulate functions of input polynomials and having reduced external bus and DSP resource requirements can be effected by using a multiplier circuit and an adder input selection circuit and supplying the proper input polynomials to the multiplier circuit and adder input of the Galois filed linear transformer unit, and also that storage requirements can be reduced by configuring the Galois field linear transformer circuit into a matrix and unity matrix whose cells represent the prediction of the remainder when the output of the multiplier is a polynomial with a power less than the power of the irreducible polynomial, and the further realization that if the multiplier engine is to be dedicated to a single use e.g. multiply, multiply-add, multiply-accumulate, the adder input selection circuit and multiply input selection circuit may also be eliminated.

This invention features a compact Galois field parallel multiplier engine including a multiplier circuit for multiplying together two polynomials with coefficients over a Galois field to obtain their product. There is a Galois field linear transformer circuit having a multiply input from the multiplier circuit, and an add input and an output for combining the add input with the predicted modulo remainder of the polynomial product for an irreducible polynomial. There is a first polynomial input to the multiplier circuit, a second polynomial input and a multiplier input selection circuit for providing to the multiplier circuit in the multiply mode the second polynomial, in the multiply-add mode the output of the Galois field linear transformer circuit and in the multiply-accumulate mode the second polynomial. An adder input selection circuit provides to the add input of the Galois field linear transformer circuit in the multiply mode an additive identity level, in the multiply-add mode, the second polynomial input and in the multiply-accumulate mode the output of the Galois field linear transformer circuit to obtain Galois field multiply, multiply-add, and multiply-accumulate functions of the input polynomials.

In a preferred embodiment the multiplier circuit may include an AND logic circuit for each term of the polynomial product to effect a Galois multiplier. The multiplier circuit may include an exclusive OR logic circuit for each pair of terms in the polynomial product to effect a Galois summation. The Galois field linear transformer circuit may include a matrix of cells each cell including an exclusive OR logic circuit and an AND logic circuit having an output connected to the exclusive OR logic circuit and an input for receiving an input data bit. The output of the Galois field linear transformer circuit may be fed back to the multiplier input selection circuit and the adder input selection circuit over a local bus in the engine. The multiplier input selection circuit may include an input from the output of the Galois field linear transformer circuit and an input from the second polynomial. The adder input selection circuit may include input from the output of the Galois field linear transformer circuit, an input from the second polynomial and a control input. Each exclusive OR logic circuit may have its output connected to the input of the next successive exclusive OR logic circuit except for the last exclusive OR logic circuit whose output is connected to the output of the matrix and the first exclusive OR logic circuit whose input is connected to the additive identity level. There maybe a reconfigurable control circuit for supplying to the Galois field linear transformer circuit, a set of coefficients for predicting the modulo remainder for a predetermined irreducible polynomial. The Galois field linear transformer circuit may include a plurality of Galois field transformer units and the reconfigurable control circuit may supply the coefficients in parallel to the Galois field transformer units. The Galois field linear transformer circuit may include a plurality of cells configured in a matrix section and a unity matrix section, wherein the unity matrix section cells represent the prediction of the remainder when the output of the multiplier circuit is a polynomial with a power less than the power of the irreducible polynomial. The Galois field linear transformer circuit may include a plurality of Galois field transformer units and the reconfigurable control circuit may supply the coefficients and parallel to the Galois field transformer units. The Galois field linear transformer circuit may include a plurality of Galois field transformer units and the reconfigurable control circuit may include a plurality of reconfigurable control units one associated with each of the Galois field linear transformer units. The additive identity level may be a null level and the functions of the input polynomials may be obtained in one cycle.

This invention also features a compact Galois field multiplier engine including a multiplier circuit for multiplying together two polynomials with coefficients over a Galois field to obtain their product. A Galois field linear transformer circuit has a multiply input from the multiplier circuit for predicting the modulo remainder of the polynomial product for an irreducible polynomial. There is a first polynomial input to the multiplier circuit, a second polynomial input, and an adder input selection circuit for providing to the add input of the Galois field linear transformer circuit in the multiply mode an additive identity level to obtain Galois field multiply functions of the input polynomials.

This invention also features a compact Galois field multiplier engine including a multiplier circuit for multiplying together two polynomials with coefficients over a Galois field to obtain their product. A Galois field linear transformer circuit having a multiply input from the multiplier circuit, an add input and an output for combining the add input with the predicted modulo remainder of the polynomial product for an irreducible polynomial. There is a first polynomial input to the multiplier circuit, a second polynomial input, an adder input selection circuit for providing to the add input of the Galois field linear transformer circuit in the multiply-add mode the second polynomial input to obtain Galois field multiply-add functions of the input polynomials.

This invention features a compact Galois field multiplier engine including a multiplier circuit for multiplying together two polynomials with coefficients over a Galois field to obtain their product. A Galois field linear transformer circuit having a multiply input from the multiplier circuit, an add input and an output for combining the add input with the predicted modulo remainder of the polynomial product for an irreducible polynomial. There is a first polynomial input to the multiplier circuit, a second polynomial input, an adder input selection circuit for providing to the add input of the Galois field linear transformer circuit in the multiply-accumulate mode the output of the Galois field linear transformer circuit to obtain Galois field multiply-accumulate functions of the input polynomials.

This invention also features a compact Galois field multiplier engine including a multiplier circuit for multiplying together two polynomials with coefficients over a Galois field to obtain their product. A Galois field linear transformer circuit having a multiply input from the multiplier circuit, an add input and an output for combining the add input with the predicted modulo remainder of the polynomial product for an irreducible polynomial. There is a first polynomial input to the multiplier circuit, a second polynomial input, a multiplier input selection circuit for providing to the multiplier circuit in the multiply mode the second polynomial and in the multiply-add mode the output of the Galois field linear transformer circuit, and an adder input selection circuit for providing to the add input of the Galois field linear transformer circuit in the multiply mode an additive identity level and in the multiply-add mode the second polynomial input, to obtain Galois field multiply and multiply-add.

This invention also features a compact Galois field multiplier engine including a multiplier circuit for multiplying together two polynomials with coefficients over a Galois field to obtain their product. A Galois field linear transformer circuit having a multiply input from the multiplier circuit, an add input and an output for combining the add input with the predicted modulo remainder of the polynomial product for an irreducible polynomial. There is a first polynomial input to the multiplier circuit, a second polynomial input, a multiplier input selection circuit for providing to the multiplier circuit in the multiply mode the second polynomial and in the multiply-accumulate mode the second polynomial, and an adder input selection circuit for providing to the add input of the Galois field linear transformer circuit in the multiply mode an additive identity level and in the multiply-accumulate mode the output of the Galois field linear transformer circuit to obtain Galois field multiply and multiply-accumulate functions of the input polynomials.

This invention also features a compact Galois field multiplier engine including a multiplier circuit for multiplying together two polynomials with coefficients over a Galois field to obtain their product. A Galois field linear transformer circuit having a multiply input from the multiplier circuit, an add input and an output for combining the add input with the predicted modulo remainder of the polynomial product for an irreducible polynomial. There is a first polynomial input to the multiplier circuit, a second polynomial input, a multiplier input selection circuit for providing to the multiplier circuit in the multiply-add mode the output of the Galois field linear transformer circuit, and in the multiply-accumulate mode the second polynomial, and an adder input selection circuit for providing to the add input of the Galois field linear transformer circuit in the multiply-add mode the second polynomial input, and in the multiply-accumulate mode the output of the Galois field linear transformer circuit to obtain Galois field multiply-add and multiply-accumulate functions of the input polynomials.

The invention also features a compact Galois field linear multiplier circuit, including a multiplier circuit for multiplying together two polynomials with coefficients over a Galois field to obtain their product and a Galois field linear transformer circuit for predicting the modulo reminder of its polynomial product for an irreducible polynomial, including a plurality of cells configured in a matrix section and a unity matrix section, where in the unity matrix section cells represent the prediction of the remainder when the output of the multiplier circuit is a polynomial with a power less than the power of the irreducible polynomial.

In a preferred embodiment each cell may include a programmable exclusive OR cell. The programmable exclusive OR cell may include an exclusive OR circuit and an AND circuit. There may be a reconfigurable control circuit for supplying to the Galois field linear transformer circuit a set of coefficients for predicting the modulo remainder for a predetermined irreducible polynomial. The Galois field linear transformer circuit may include a plurality of Galois field linear transformer circuit units. The reconfigurable control circuit may supply the coefficients in parallel to the Galois field transformer units or the reconfigurable control circuit may include a plurality of reconfigurable control units, one associated with each of the Galois field linear transformer units.

The invention also features a simpler Galois field multiplier engine adapted for selected operations of multiply, multiply-add, and multiply-accumulate operations without adder and multiplier input selection circuits.

BRIEF DESCRIPTION OF THE DRAWINGS

Other objects, features and advantages will occur to those skilled in the art from the following description of a preferred embodiment and the accompanying drawings, in which:

FIG. 11 is a schematic view of a polynomial multiplier usable in FIGS. 2, 3, 5 and 9;

FIG. 12 is an illustration the transfer function for the polynomial multiplier of FIG. 11.

DISCLOSURE OF THE PREFERRED EMBODIMENT

Figure 1:
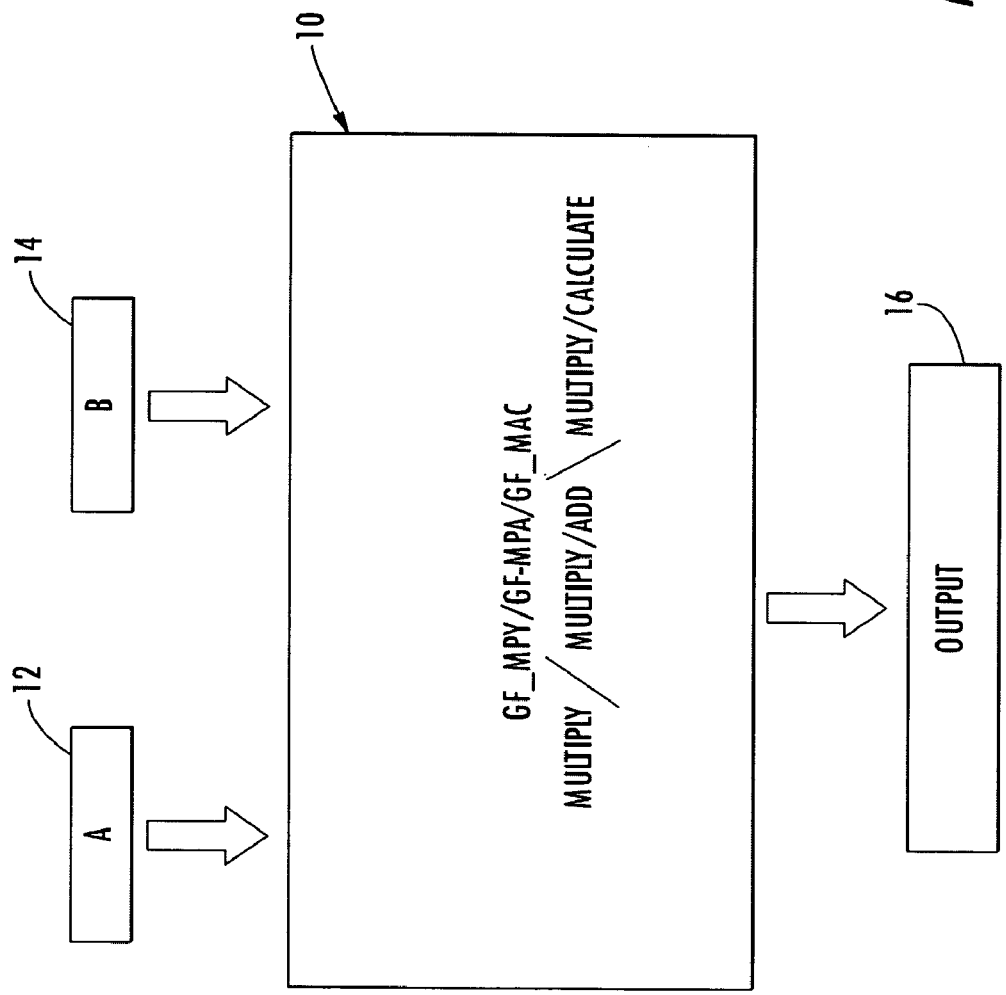
FIG. 1 is a functional block diagram of a compact Galois field multiplier engine according to the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

A Galois field GF(n) is a set of elements on which two binary operations can be performed. Addition and multiplication must satisfy the commutative, associative and distributive laws. A field with a finite number of elements is a finite field. An example of a binary field is the set {0,1} under modulo 2 addition and modulo 2 multiplication and is denoted GF(2). The modulo 2 addition and multiplication operations are defined by the tables shown in the following Figure. The first row and the first column indicate the inputs to the Galois field adder and multiplier. For e.g. 1+1=0 and 1*1=1.

Modulo 2 Addition (XOR)

| + | 0 | 1 |
|---|---|---|
| 0 | 0 | 1 |
| 1 | 1 | 0 |

Modulo 2 Multiplication (AND)

| * | 0 | 1 |
|---|---|---|
| 0 | 0 | 0 |
| 1 | 0 | 1 |

In general, if p is any prime number then it can be shown that GF(p) is a finite field with p elements and that $GF(p^m)$ is an extension field with $p^m$ elements. In addition, the various elements of the field can be generated as various powers of one field element, $\alpha$, by raising it to different powers. For example GF(256) has 256 elements which can all be generated by raising the primitive element, $\alpha$, to the 256 different powers.

In addition, polynomials whose coefficients are binary belong to GF(2). A polynomial over GF(2) of degree m is said to be irreducible if it is not divisible by any polynomial over GF(2) of degree less than m but greater than zero. The polynomial $F(X)=X^2+X+1$ is an irreducible polynomial as it is not divisible by either X or X+1. An irreducible polynomial of degree m which divides $X^{2m-1}+1$, is known as a primitive polynomial. For a given m, there may be more than one primitive polynomial. An example of a primitive polynomial for m=8, which is often used in most communication standards is $F(X)=0x11d=x^8+x^4+x^3+x^2+1$.

Galois field addition is easy to implement in software, as it is the same as modulo addition. For example, if 29 and 16 are two elements in $GF(2^8)$ then their addition is done simply as an XOR operation as follows: 29 (11101)$\oplus$16 (10000)=13(01101).

Galois field multiplication on the other hand is a bit more complicated as shown by the following example, which computes all the elements of $GF(2^4)$, by repeated multiplication of the primitive element $\alpha$. To generate the field elements for $GF(2^4)$ a primitive polynomial G(x) of degree m=4 is chosen as follows $G(x)=X^4+X+1$. In order to make the multiplication be modulo so that the results of the multiplication are still elements of the field, any element that has the fifth bit set is brought into a 4-bit result using the following identity $F(\alpha)=\alpha^4+\alpha+1=0$. This identity is used repeatedly to form the different elements of the field, by setting $\alpha^4=1+\alpha$. Thus the elements of the field can be enumerated as follows:

$\{0, 1, \alpha, \alpha^2, \alpha^3, 1+\alpha, \alpha+\alpha^2, \alpha^2+\alpha^3, 1+\alpha+\alpha^3, \ldots 1+\alpha^3\}$ since $\alpha$ is the primitive element for $GF(2^4)$ it can be set to 2 to generate the field elements of $GF(2^4)$ as $\{0, 1, 2, 4, 8, 3, 6, 12, 11 \ldots 9\}$.

It can be seen that Galois field polynomial multiplication can be implemented in two basic steps. The first is a calculation of the polynomial product $c(x)=a(x)*b(x)$ which is algebraically expanded, and like powers are collected (addition corresponds to an XOR operation between the corresponding terms) to give c(x). For example $c(x)=(a_3x^3+a_2x^2+a_1x^1+a_0)*(b_3x^3+b_2x^2+b_1x^1+b_0)$ $c(x)=c_6x^6+c_5x^5+c_4x^4+c_3x^3+c_2x^2+c_1x^1+c_0$ where:

Chart I $c_0=a_0*b_0$ $c_1=a_1*b_0\oplus a_0*b_1$ $c_2=a_2*b_0\oplus a_1*b_1\oplus a_0*b_2$ $c_3=a_3*b_0\oplus a_2*b_1\oplus a_1*b_2\oplus a_0b_3$ $c_4=a_3*b_1\oplus a_2*b_2\oplus a_1*b_3$ $c_5=a_3*b_2\oplus a_2*b_3$ $c_6=a_3*b_3$ The second is the calculation of d(x)=c(x) modulo p(x).

To illustrate, multiplications are performed with the multiplication of polynomials modulo an irreducible polynomial. For example: (if $m(x)=x^8+x^4+x^3+x+1$) $\{57\}*\{83\}=\{c1\}$ because, First Step $(x^6 + x^4 + x^2 x + 1) + (x^7 + x + 1) = x^{13} \oplus x^{11} \oplus x^9 \oplus x^8 \oplus x^7$
$x^7 \oplus x^5 \oplus x^3 \oplus x^2 \oplus x$
$x^6 \oplus x^4 \oplus x^2 \oplus x \oplus x$
$= x^{13} \oplus x^{11} \oplus x^9 \oplus x^8 \oplus x^6 \oplus$
$x^5 \oplus x^4 \oplus x^3 \oplus 1$ Second Step $x^{13} + x^{11} + x^9 + x^8 + x^6 + x^5 x^4 + x^3 + 1 \text{ modulo } (x^8 + x^4 + x^3 + x + 1) =$
$x^7 + x^6 + 1$ An improved Galois field multiplier system 10, foreclosing on this approach includes a multiplier circuit for multiplying two polynomials $a_0$–$a_7$ in an A register with the polynomial $b_0$–$b_7$ in an B register with coefficients over a Galois field to obtain their product is given by the fifteen-term polynomial c(x) defined as Chart II. The multiplier circuit actually includes a plurality of multiplier cells.

Chart II $c14=a7*b7$ $c13=a7*b6\oplus a6*b7$ $c12=a7*b5\oplus a6*b6\oplus a5*b7$ $c11=a7*b4\oplus a6*b5\oplus a5*b6\oplus a4*b7$ $c10=a7*b3\oplus a6*b4\oplus a5*b5\oplus a4*b6\oplus a3b7$ $c9=a7*b2\oplus a6*b3\oplus a5*b4\oplus a4*b5\oplus a3b6\oplus a2*b7$ $c8=a7*b1\oplus a6*b2\oplus a5*b3\oplus a4*b4\oplus a3b5\oplus a2*b6\oplus a1*b7$ $c7=a7*b0\oplus a6*b1\oplus a5*b2\oplus a4*b3\oplus a3b4\oplus a2*b5\oplus a1*b6\oplus a0*b7$ $c6=a6*b0\oplus a5*b1\oplus a4*b2\oplus a3*b3\oplus a2b4\oplus a1*b5\oplus a0*b6$ $c5=a5*b0\oplus a4*b1\oplus a3*b2\oplus a2*b3\oplus a1b4\oplus a0*b5;$ $c4=a4*b0\oplus a3*b1\oplus a2*b2\oplus a1*b3\oplus a0b4$ $c3=a3*b0\oplus a2*b1\oplus a1*b2\oplus a0*b3$ $c2=a2*b0\oplus a1*b1\oplus a0*b2$ $c1=a1*b0\oplus a0*b1$ $c0=a0*b0$ The operation of a Galois field multiplier system is explained in U.S. patent application to Stein et al. entitled GALOIS FIELD MULTIPLIER SYSTEM [AD-240J] Ser. No. 10/060,699 filed Jan. 30, 2002 which are incorporated herein in their entirety by this reference.

Each of the fifteen polynomial c(x) term includes an AND function as represented by an * and each pair of terms are combined with a logical exclusive OR as indicated by a $\oplus$. This product as represented in Chart II is submitted to a Galois field linear transformer circuit which may include a number of Galois field linear transformer units each composed of 15×8 cells, which respond to the product produced by the multiplier circuit to predict the modulo remainder of the polynomial product for a predetermined irreducible polynomial. The $A_0$, $B_0$ multiplication is performed in a first unit the $A_1$, $B_1$ in a second unit, the $A_2$, $B_2$ in a third unit, and the $A_n$, $B_n$ in the last unit. The operation of a Galois field linear transformer circuit and each of its transformer units is explained in U.S. patent application to Stein et al. entitled GALOIS FIELD LINEAR TRANSFORMER[AD-239J] Ser. No. 10/051,533 with a filing date of Jan. 18, 2002, which is incorporated herein in its entirety by this reference. Each of the Galois field linear transformer units predicts the modulo remainder by dividing the polynomial product by an irreducible polynomial. That irreducible polynomial may be, for example, anyone of those shown in Chart III.

Chart III

:$GF(2^1)$

0x3 (x+1)

:$GF(2^2)$

0x7 ($x^2$+x+1)

:$GF(2^3)$

0xB ($x^3$+x+1)

0xD ($x^3$+$x^2$+1)

:$GF(2^4)$

0x13 ($x^4$+x+1)

0x19 ($x^4$+$x^3$+1)

:$GF(2^5)$

0x25 ($x^5$+$x^2$+1)

0x29 ($x^5$+$x^3$+1)

0x2F ($x^5$+$x^3$+$x^2$+x+1)

0x37 (x $^5$+$x^4$+$x^2$+x+1)

0x3B ($x^5$+$x^4$+$x^3$+x+1)

0x3D ($x^5$+$x^4$+$x^3$+$x^2$+1)

:$GF(2^6)$

0x43 ($x^6$+x+1)

0x5B ($x^6$+$x^4$+$x^3$+x+1)

0x61 ($x^6$+$x^5$+1)

0x67 ($x^6$+$x^5$+$x^2$+x+1)

0x6D ($x^6$+$x^5$+$x^3$+$x^2$+1)

0x73 ($x^6$+$x^5$+$x^4$+x+1)

:$GF(2^7)$

0x83 ($x^7$+x+1)

0x89 ($X^7$+$x^3$+1)

0x8F ($x^7$+$x^3$+$x^2$+x+1)

0x91 ($x^7$+$x^4$+1)

0x9D ($x^7$+$x^4$+$x^3$+$x^2$+1)

0xA7 ($x^7$+$x^5$+$x^2$+x+1)

0xAB (x7+x5+x3+x+1)

0xB9 ($X^7$+$x^5$+$x^4$+$x^3$+1)

0xBF ($x^7$+$x^5$+$x^4$+$x^3$+$x^2$+x+1)

0xC1 ($x^7$+$x^6$+1)

0xCB ($x^7$+$x^6$+$x^3$+x+1)

0xD3 ($x^7$+$x^6$+$x^4$+x+1)

0xE5 ($x^7$+$x^6$+$x^5$+$x^2$+x+1)

0xF1 ($x^7$+$x^6$+$x^5$+$x^4$+1)

0xF7 ($x^7$+$x^6$+$x^5$+$x^4$+$x^2$+x+1)

0xFD ($x^7$+$x^6$+$x^5$+$x^4$+$x^3$+$x^2$+1)

:$GF(2^8)$

0x11D ($x^8$+$x^4$+$x^3$+$x^2$+1)

0x12B ($x^8$+$x^5$+$x^3$+x+1)

0x12D ($x^8$+$x^5$+$x^3$+$x^2$+1)

0x14D ($x^8$+$x^6$+$x^3$+$x^2$+1)

0x15F ($x^8$+$x^6$+$x^4$+$x^3$+$x^2$+x+1)

0x163 ($x^8$+$x^6$+$x^5$+x+1)

0x165 ($x^8$+$x^6$+$x^5$+$x^2$+1)

0x169 ($x^8$+$x^6$+$x^5$+$x^3$+1)

0x171 ($x^8$+$x^6$+$x^5$+$x^4$+1)

0x187 ($x^8$+$x^7$+$x^2$+x+1)

0x18D ($x^8$+$x^7$+$x^3$+$x^2$+1)

0x1A9 ($x^8$+$x^7$+$x^5$+$x^3$+1)

0x1C3 ($x^8$+$x^7$+$x^6$+x+1)

0x1CF ($x^8$+$x^7$+$x^5$+$x^3$+$x^2$+x+1)

0x1E7 ($x^8$+$x^7$+$x^6$+$x^5$+$x^2$+x+1)

0x1F5 ($x^8$+$x^7$+$x^5$+$x^4$+$x^2$+1)

The Galois field multiplier presented here GF($2^8$) is capable of performing with powers $2^8$ and powers $2^4$ and under as shown in Chart III.

An example of the GF multiplication according to this invention occurs as follows:

| Before GF( ) multiplication;<br>Polynomial 0x11d | After GF9( ) multiplication;<br>Polynomial 0x11d |
|---|---|
| 45 23 00 01h | 45 23 00 01h |
| GF( ) | GF( ) |
| 57 34 00 01h | 57 34 00 01h |
| xx xx xx xxh | 72 92 00 01h |

There is shown in FIG. 1 a compact Galois field multiplier engine 10 according to this invention accompanied by an A input register 12, B input register 14 and an output register 16. Compact Galois field engine 10 is capable of a number of different operations, including multiply, multiply-add and multiply-accumulate.

Figures 2, 4:
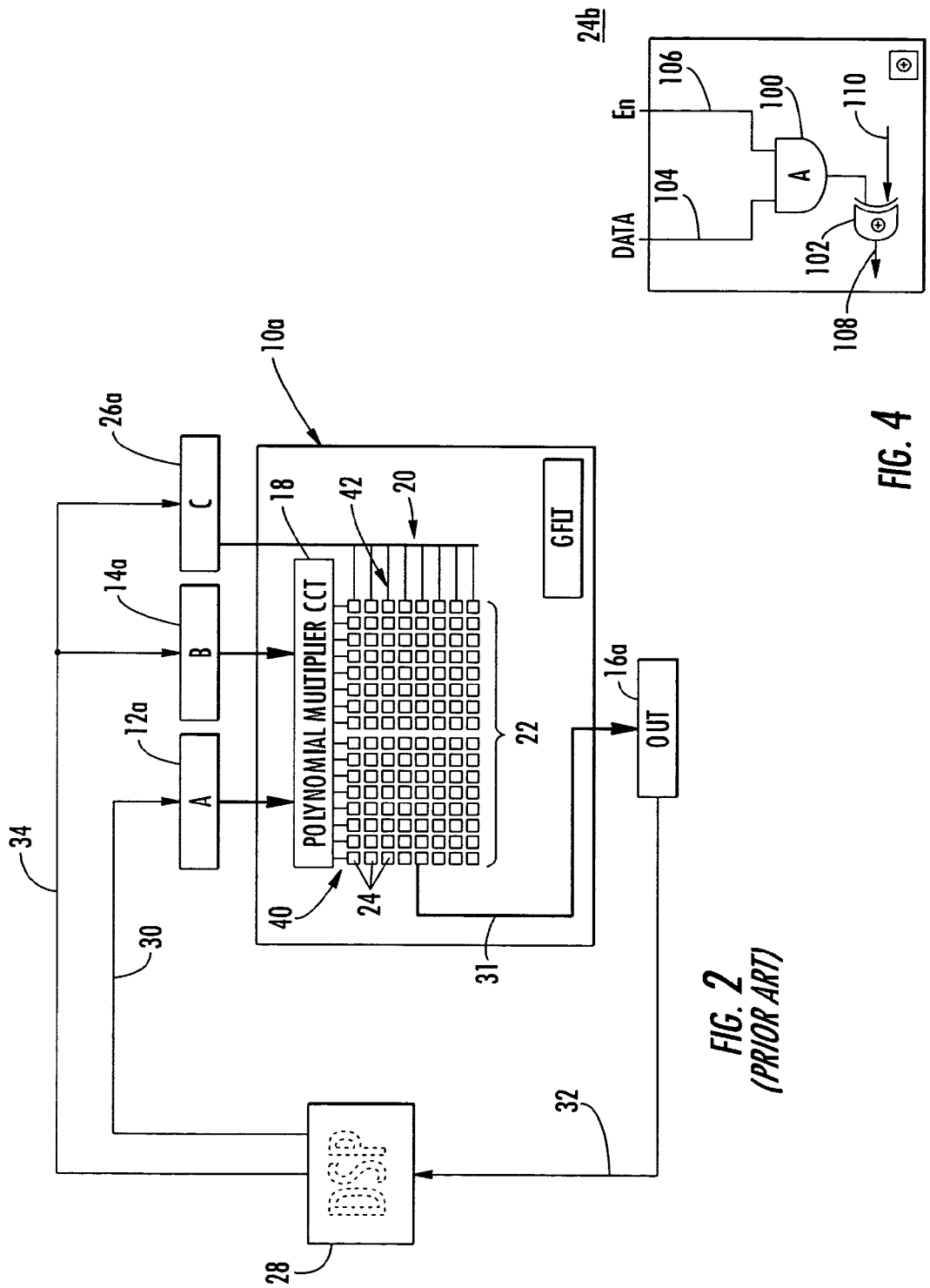
FIG. 2 is a more detailed functional block diagram of a conventional Galois field multiplier engine according to the invention.
FIG. 4 is a schematic of a typical programmable X-OR circuit cell for the matrix of the Galois field linear transformer circuit of FIGS. 2 and 3.

Conventional Galois field multiplier engines 10a, FIG. 2 requires three registers, A register 12a, B register 14a and C register 26a. The burden of these registers must be carried by the associated digital signal processor (DSP) core 28 and require extensive external bus work. In addition to bus 30, for supplying data to A register 12a, bus 34 for supplying data to B register 14a and bus 36 for supplying data to C register 26a, there is required a bus 32 for feeding back the output from register 16a to the digital signal processor 28 and bus 34 or bus 36 for feeding back that output from digital signal processor 28 to B register 14a or C register 26a. Bus 31 connects the output of Galois field linear transformer circuit 20 and output register 16a. Thus polynomial multiplier circuit 18 can provide to the multiple input 40 of matrix 22 of Galois field linear transformer circuit 20 the proper values in conjunction with the values fed from C register 26a to the adder input 42 of matrix 22 to perform multiply, multiply-add and multiply-accumulation functions. Matrix 22 is shown here as an eight by fifteen matrix for supporting multiplication of polynomials of power eight but may be made larger or smaller, containing more or fewer cells 24, depending upon the power of the polynomial to be serviced.

Figure 3:
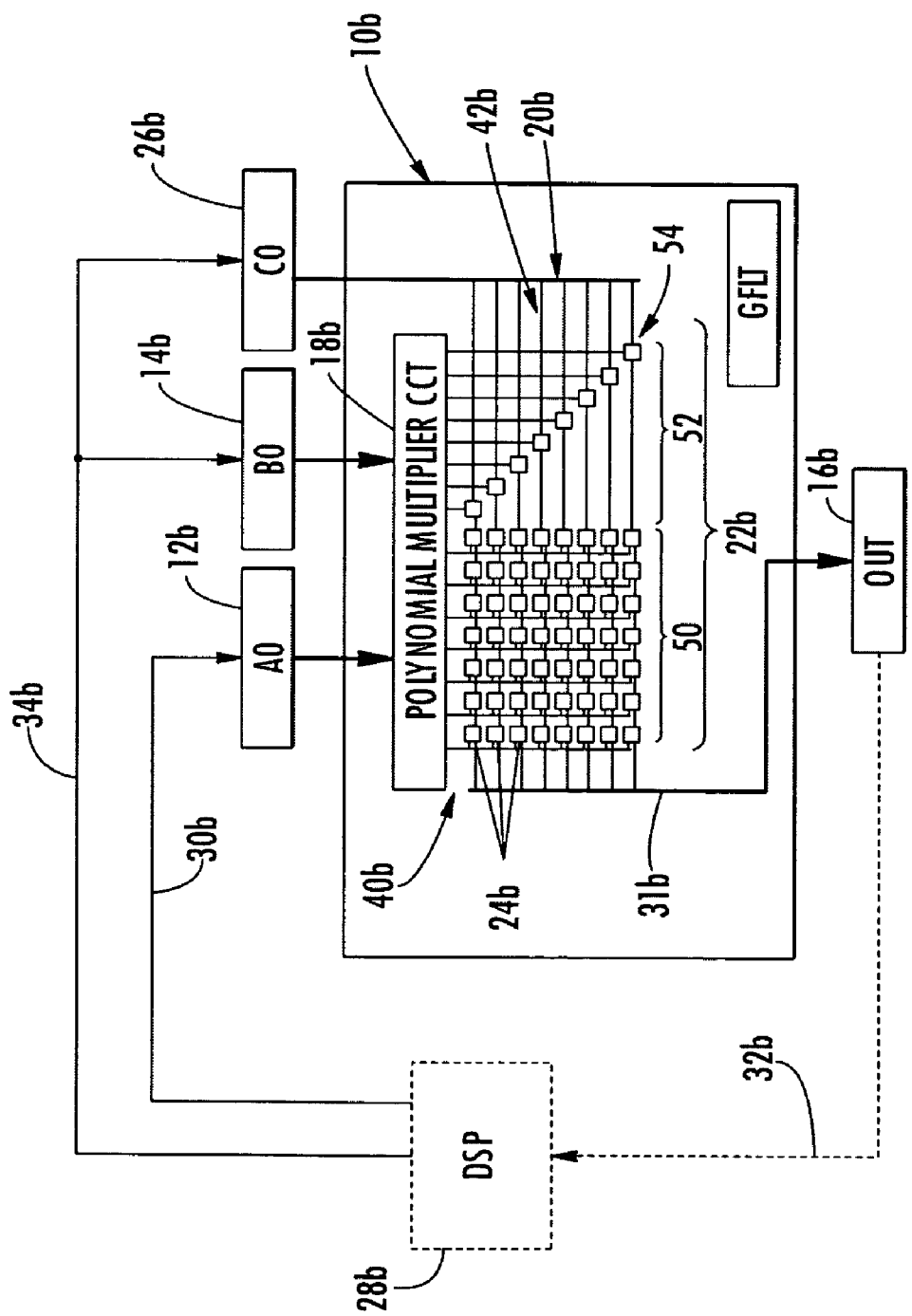
FIG. 3 is a more detailed functional block diagram of the compact Galois field multiplier-engine of FIG. 1 displaying the reduced size Galois field linear transformer unity matrix feature of the invention.

In accordance with this invention, the number of cells 24b per row, FIG. 3, of matrix 22b of Galois field linear transformer circuit 20b in engine 10b maybe reduced by nearly half, by configuring matrix 22b into two matrix sections, a matrix section 50 and a unity matrix section 52. The unity matrix section requires only one set of cells 54 wherein these unity matrix section cells represent the prediction of the remainder when the output of the multiplier circuit is a polynomial with a power less than the power of the irreducible polynomial. Thus in FIG. 3 where the irreducible polynomial has a power of eight any polynomial of less than eight will not exceed the modulo and will be passed right through the matrix, thus the absent cells in unity matrix section 52 are unnecessary. This saves nearly half of the cells required for the matrix 22b resulting in a smaller, simpler and faster engine.

Each cell 24b, FIG. 4, may include an AND circuit 100 and an exclusive OR circuit 102. There is a data input 104 and an enable input 106. Exclusive OR circuit 102 provides an output on line 108 to the input of the next exclusive OR circuit and receives at its input 110 the output from the previous exclusive OR circuit, except for the last exclusive OR circuit whose output is connected to the output of the matrix and the first exclusive OR circuit whose input is connected to the adder input 42b, FIG. 3, or 42g, FIG. 9. An enable signal on line 106 enables the data on line 104 to pass through AND gate 100 and to be exclusively ORed by exclusive OR circuit 102 with the input on line 110. The lack of an enabling signal on line 106 simply passes the input on line 110 through the exclusive OR gate 102 to output line 108. An enabling signal on line 106 enables cell 24. In this manner the entire matrix maybe reconfigured for any particular irreducible polynomial.

Figure 5:
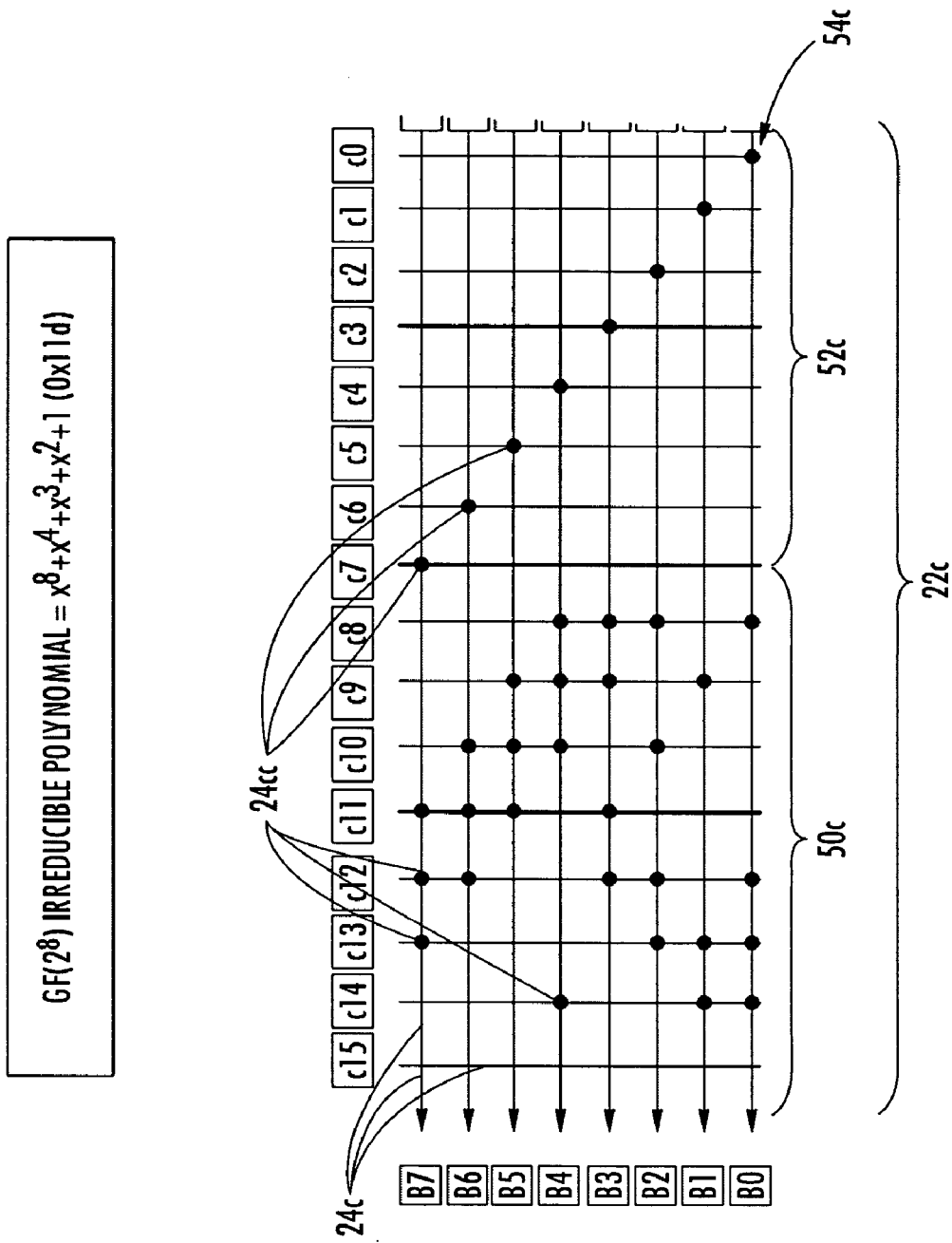
FIG. 5 is a simplified schematic diagram of the Galois field linear transformer circuit of FIGS. 3 and 9 illustrating the programming of the matrix section and unity matrix section cells according to the invention for a particular polynomial of power eight.
Figure 6:
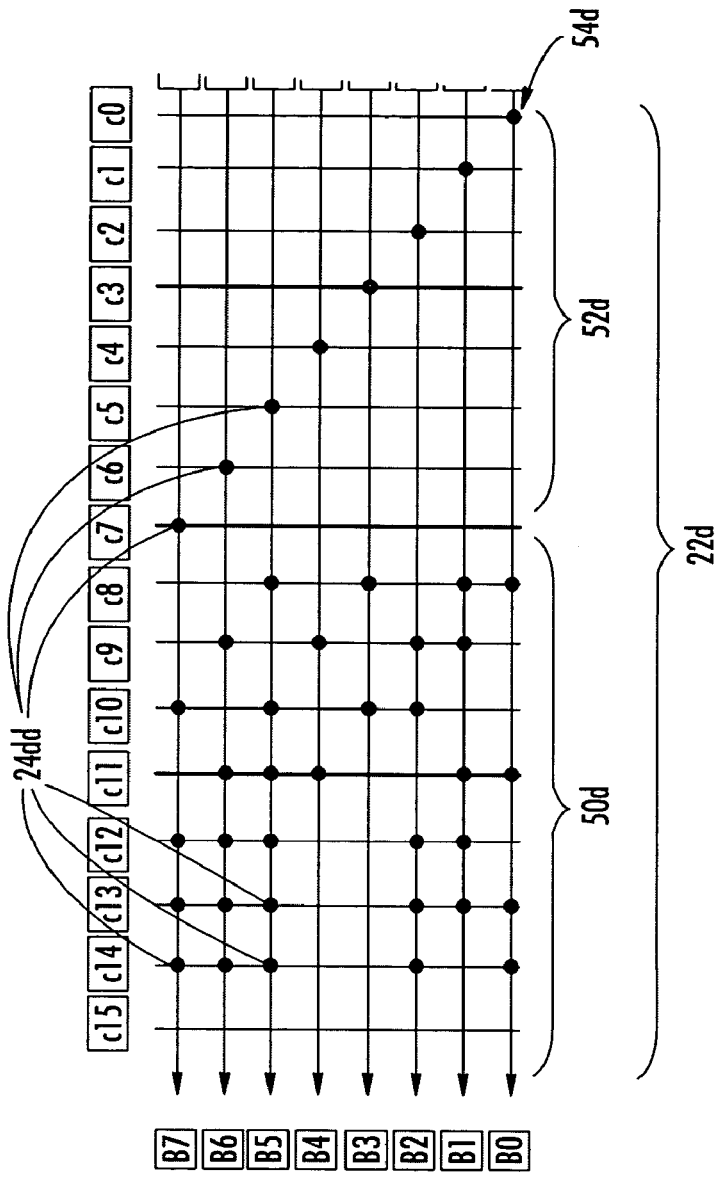
FIG. 6 is a simplified schematic diagram of the Galois field linear transformer circuit of FIGS. 3 and 9 illustrating the programming of the matrix section and unity matrix section cells according to the invention for another polynomial of power eight.

The efficacy of engine 10b, FIG. 3, can be understood by choosing an irreducible polynomial from Chart III, supra, and implementing it by enabling the necessary cells. For example, to implement the first polynomial of power eight designated 0x11d representing the irreducible polynomial $x^8+x^4+x^3+x^2+1$, the enabled cells, indicated generally at 24cc, form a unity matrix 52c, FIG. 5, with a line of cells 54c as previously depicted in FIG. 3. When choosing the second irreducible polynomial from Chart III, 0x12b, the irreducible polynomial $x^8+x^5+x^3+x+1$ produces a pattern of enabled cells 24dd, FIG. 6, in matrix section 50d and unity matrix 52d where once again the unity matrix section 52d results in a line of enabled cells 54d.

Figure 7:
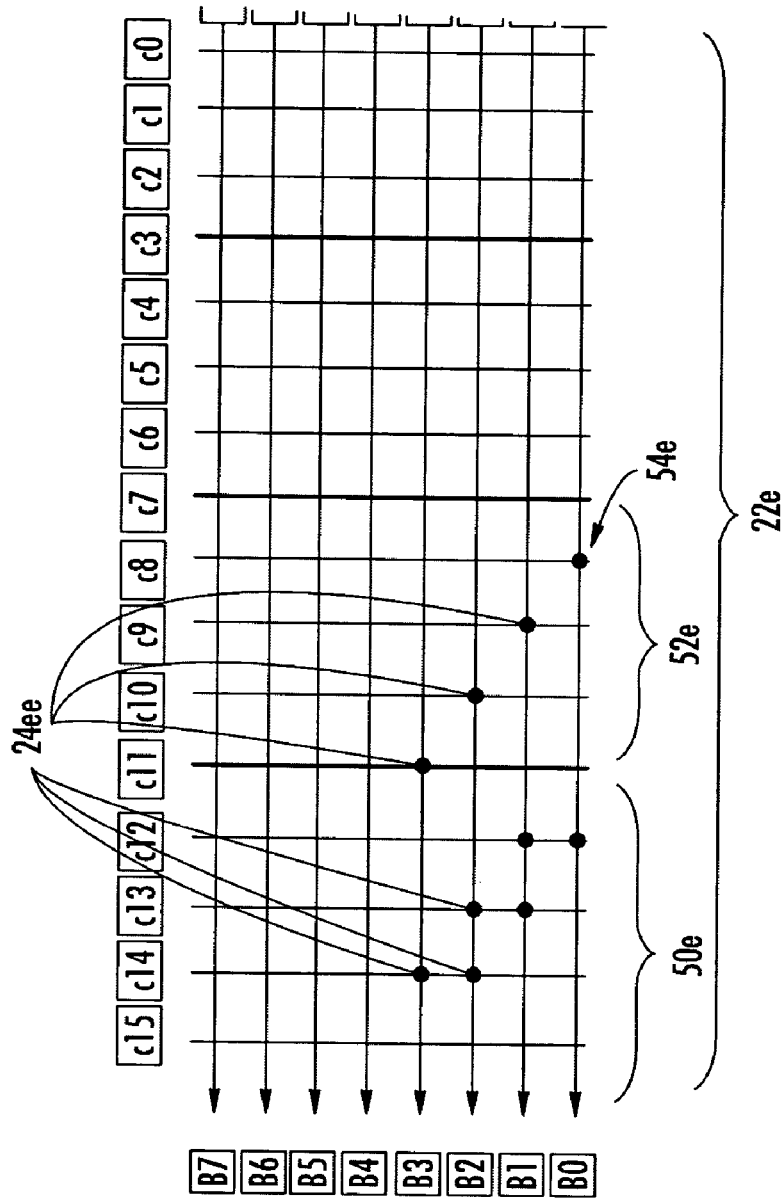
FIG. 7 is a simplified schematic diagram of the Galois field linear transformer circuit of FIGS. 3 and 9 illustrating the programming of the matrix section and unity matrix section cells according to the invention for yet another polynomial of power four.

The reduction in the number of required cells is not limited to only polynomials having the same power as the irreducible polynomial. It also applies to any of those having the power of one half or less of the power of the irreducible polynomial. For example, the eight by fifteen matrix 22b, shown in FIG. 3 and referred to by way of explanation in FIGS. 5 and 6 could also support polynomials to the power of one, two, three, or four, but not powers of five, six and seven, if the irreducible polynomial power was sixteen the matrix that supported it could also support polynomials up to eight, but not nine through fifteen. If it were the power of thirty-two it could support polynomials of thirty-two power and up to sixteen, but not seventeen through thirty-one. For example, as shown in FIG. 7 for an irreducible polynomial of the fourth power both the matrix section 50e and unity matrix section 52e become smaller and can be implemented anywhere within matrix 22e. Here the matrix section 50e has a plurality of enabled cells 24ee along with the enabled cells in unity matrix 52e which now has a smaller line of enabled cells 54e, making up the unity matrix section 52e.

Figure 8:
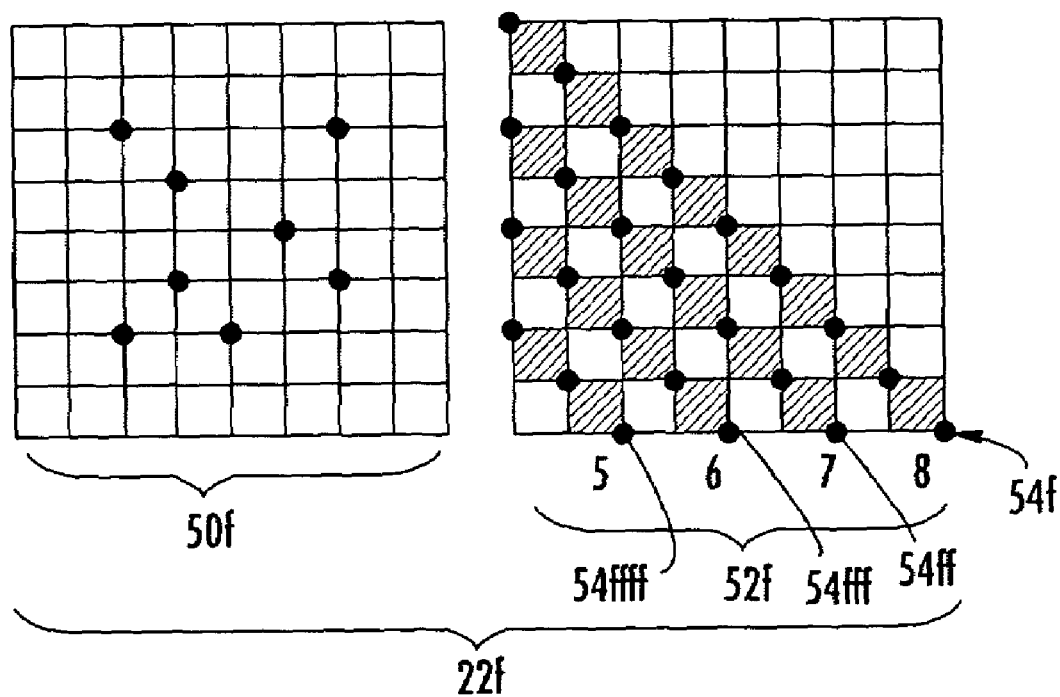
FIG. 8 is a simplified schematic diagram of the Galois field linear transformer circuit of FIGS. 3 and 9 illustrating the programming of a second matrix section as a sparse matrix for supporting polynomial powers between half (4) powers and full (8) powers in this particular embodiment.

If it is desirable to service the intermediate polynomials of power five, six and seven the unity matrix section can be replaced with a sparse matrix section 52f, FIG. 8, wherein additional lines of enabled cells 54ff, 54fff, 54ffff, can be employed to support polynomials of power seven, six and five respectively. But it is somewhat less of a reduction in the size of the matrix and required number of cells.

Figure 9:
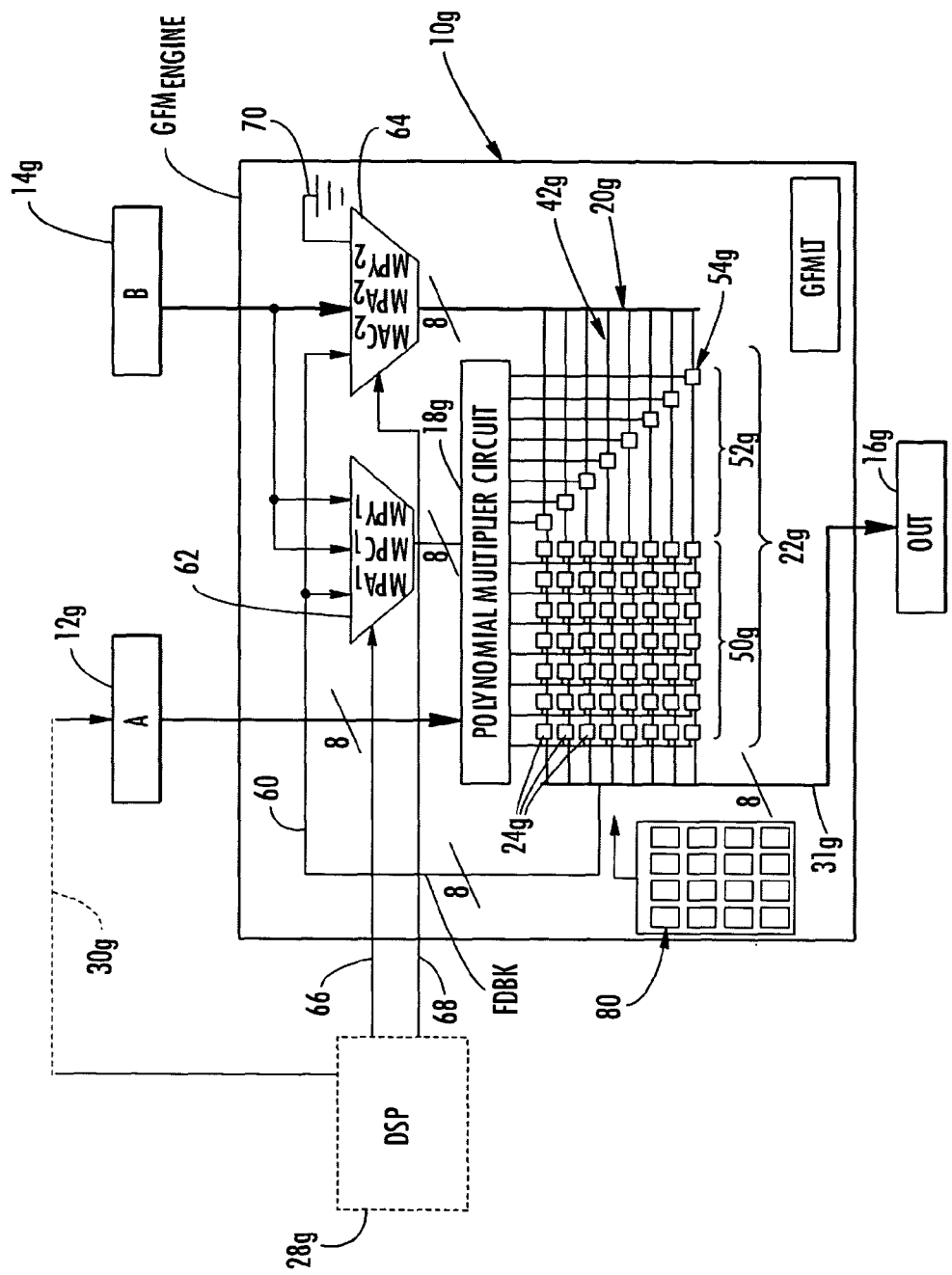
FIG. 9 is a more detailed block diagram of a compact Galois field multiplier engine of FIG. 1 incorporating both the reduced size matrix and the reduced hardware and localized bus features of the invention.

In accordance with another feature of the invention, the number of input registers can be reduced from three to two and the number of external buses relied upon to communicate with the digital signal processor (DSP) 28g, FIG. 9, can be reduced and localized to be internal of the engine 10g itself. Thus, as shown in FIG. 9, there are but two input registers A 12g and B 14g and the feedback from output 31g does not need to go through DSP 28g but goes directly, locally, on engine 10g through internal bus 60 to multiplier input selection circuit 62 and adder input selection circuit 64. Digital signal processor 28g need only provide control signals on line 66 to multiplier input selection circuit 62 and on line 68 to adder input selection circuit 64. Thus in the multiply mode, multiplier input selection circuit 62, passes an input from B register 14g to polynomial multiplier circuit 18g while adder input selection circuit 64 provides an additive identity level, in this case, a ground level 70 to the adder input 42g of Galois field linear transformer circuit 20g. In the multiply-add mode digital signal processor 28 instructs multiplier input selection circuits 62 to feed back the output from matrix 22g over line 60 to polynomial multiplier circuit 18g and instructs adder input selection circuits 64 to pass the polynomial in B register 14g to the adder input 42g of Galois field linear transformer circuit 20g. In the multiply-accumulate mode digital signal processor 28g instructs multiplier input selection circuit 62 to deliver the polynomial from B register 14g to polynomial multiplier circuit 18g and instructs adder input selection circuit 64 to feed back the output on line 60 of Galois field linear transformer circuit 20g.

Another feature of this invention is the reconfigurability of Galois field linear transformer circuit 20g by virtue of the selective enablement of cells 24g. Reconfigurable control circuit 80 selectively enables the ones of cells 24g required to implement the coefficients of the selected irreducible polynomial and itself can be reduced in size since the number of cells it needs to control has been reduced in accordance with this invention.

The operation of a reconfigurable input Galois field linear transformer circuit is explained in U.S. patent application Ser. No. 10/136,170, filed May 1, 2002 to Stein et al., entitled RECONFIGURABLE INPUT GALOIS FIELD LINEAR TRANSFORMER SYSTEM, published as US 2003/0115234 A1 on Jun. 19, 2003, and all its priority applications and documents which are incorporated herein in their entirety by this reference.

Figure 10:
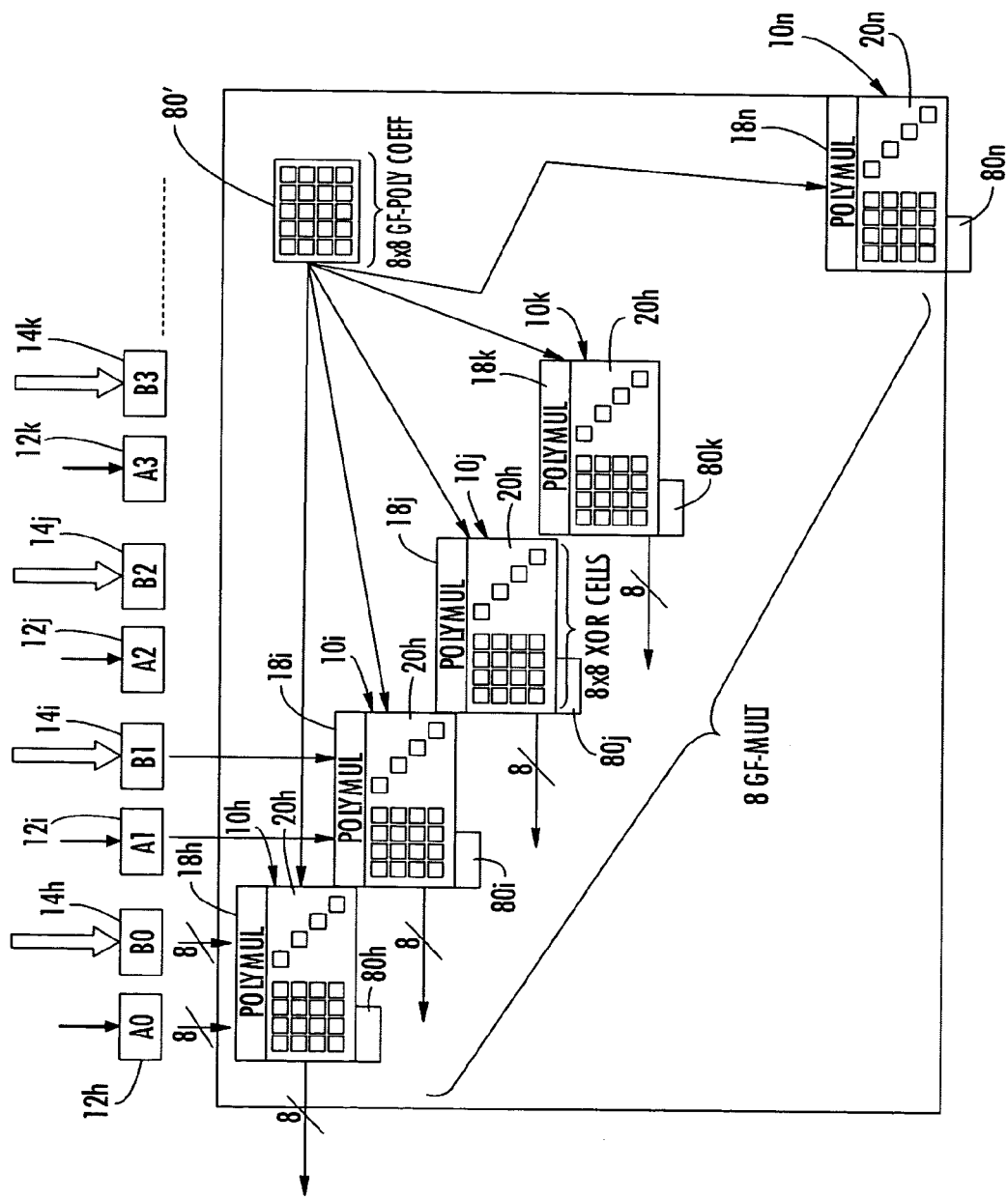
FIG. 10 is a block diagram of Galois field multiplier engine according to the invention employing a number of Galois field linear transformer units.

Although thus far the invention has been explained for the sake of simplicity with respect to only one engine, a number of the engines may be employed together as shown in FIG. 10 where each engine has a multiplier circuit 10h, 10i, 10j, 10k . . . 10n and a Galois field linear transformer 20h, 20i, 20j, 20k . . . 20n circuit. With a single central reconfigurable control circuit $80^1$ controlling them all. These engines can share the same wide [32, 64, 128]bit A and B registers were each operates on a different 8 bit (Byte) segment, or each can be serviced by its own reconfigurable control unit 80h, 80i, 80j, 80k . . . 80n and each by its own pair of A and B registers $A_0$, and $B_0$ 12h, and 14h; $A_1$ and, $B_1$, 12i, and 14i; $A_2$ and $B_2$, 12j and 14j, $A_3$ and $B_3$ 12k and 14k and A polynomial multiplier circuit 181, FIG. 11, usable in the embodiment shown herein to provide an output c0–c14 includes a plurality of AND gates 120 which combined with exclusive OR gates 122 can multiply any pair of polynomials from A register 121 and B register 141 e.g., polynomials $a_0$–$a_7$, polynomials $b_0$–$b_7$ as illustrated in the table 124 FIG. 12.

Figure 13:
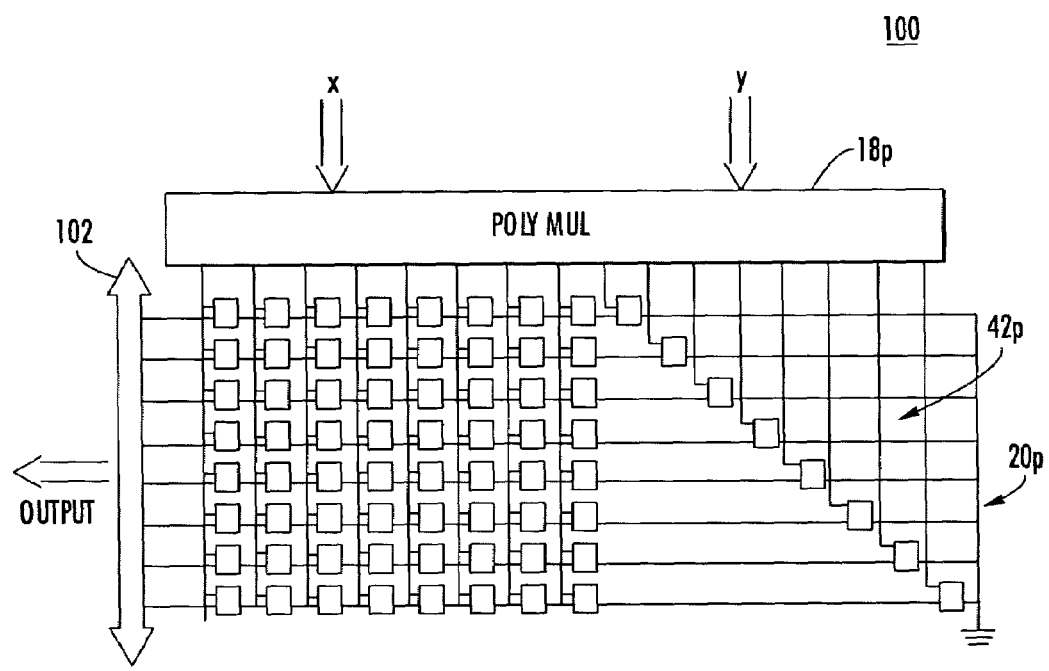
FIGS. 13, 14, and 15 are simplified schematic diagrams of Galois field multiplier engines dedicated, respectively, to multiply, multiply-accumulate, multiply-add operations according to this invention.
Figure 14:
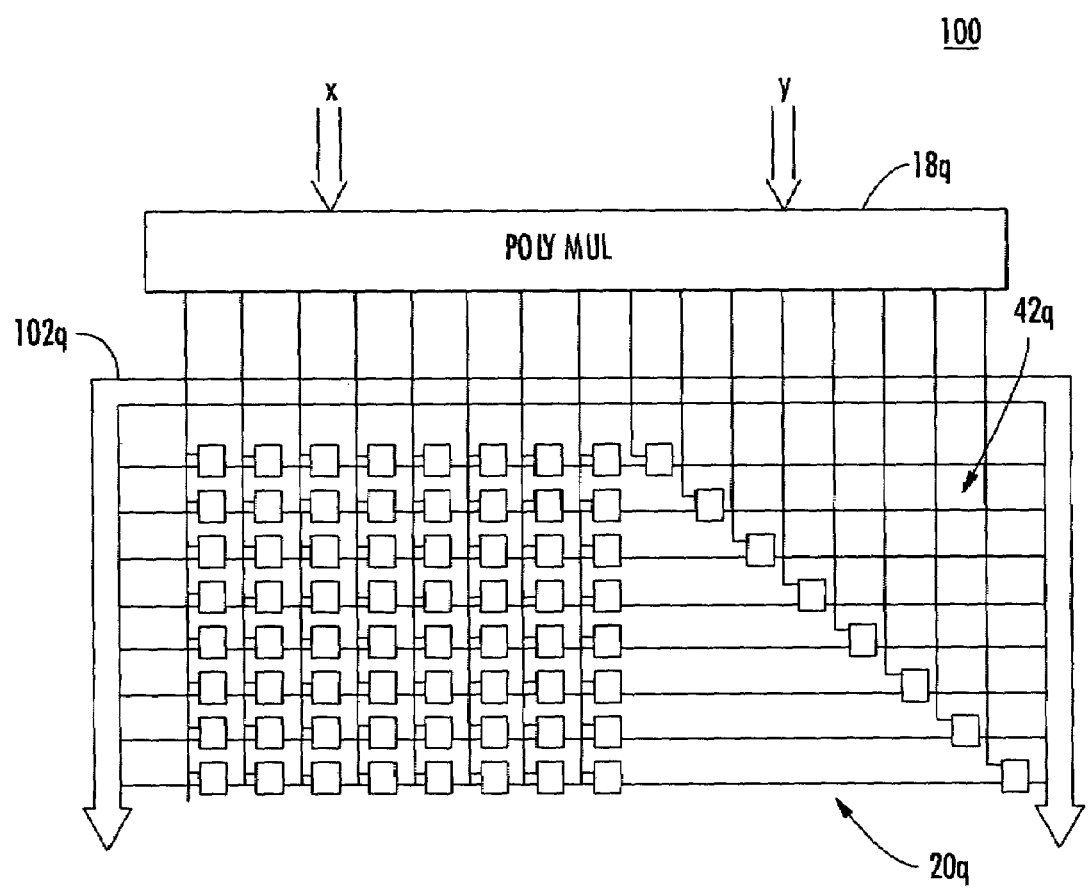
Figure 15:
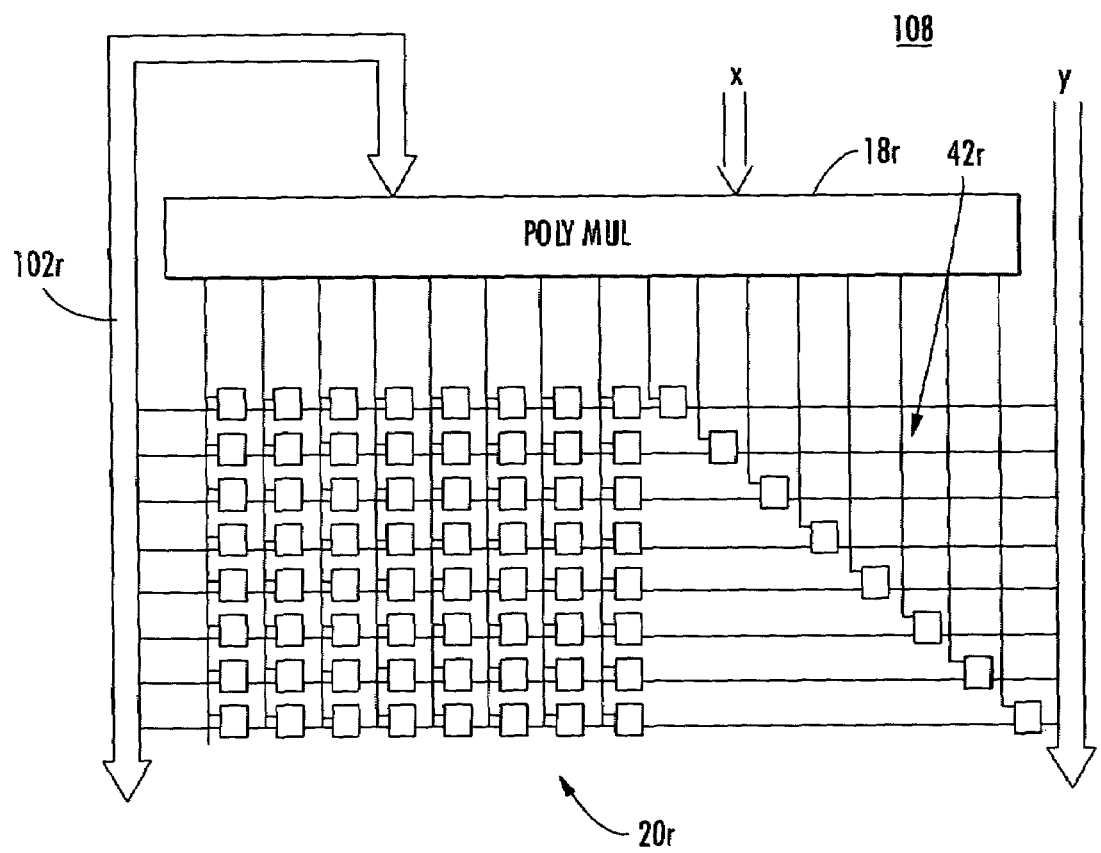

If the multiplier engine is to be dedicated to a single use e.g. multiply, multiply-add, multiply-accumulate then the multiplier input selection circuit and adder input selection circuit can be eliminated in favor of a simpler construction such as shown in FIGS. 13, 14, and 15.

Such a Galois field multiply engine 100, FIG. 13, includes polynomial multiplier circuit 18p and Galois field transformer circuit 20p which receives the polynomial product from multiplier circuit 18p and combines it with adder input 42p to produce the output at 102 but here an additive identity level is supplied to the adder input.

A Galois field multiply-accumulate engine 104, FIG. 14, includes polynomial multiplier circuit 18q and Galois field transformer circuit 20q which receives the polynomial product from multiplier circuit 18q and combines it with adder input 42q to produce the output at 102q. But here the output 102q is fed back to adder input 42p.

A Galois field multiply-add engine 108, FIG. 15, includes polynomial multiplier circuit 18r and Galois field transformer circuit 20r which receives the polynomial product from multiplier circuit 18r and combines it with adder input 42r to produce the output at 102r. But here the output 102r is fed back to multiplier circuit 18r.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A compact Galois field multiplier engine comprising:
   a multiplier circuit for multiplying together two polynomials with coefficients over a Galois field to obtain their product;
   a Galois field linear transformer circuit for predicting the modulo remainder of the polynomial product, the Galois field linear transformer having a multiply input from said multiplier circuit, an add input and an output for combining the add input with the predicted modulo remainder of the polynomial product for an irreducible polynomial;
   a first polynomial input to said multiplier circuit;
   a second polynomial input;
   a multiplier input selection circuit for providing to said multiplier circuit in the multiply mode said second polynomial, in the multiply-add mode said output of said Galois field linear transformer circuit, and in the multiply-accumulate mode said second polynomial; and
   an adder input selection circuit for providing to said add input of said Galois field linear transformer circuit in the multiply mode an additive identity, in the multiply-add mode said second polynomial input, and in said multiply-accumulate mode said output of said Galois field linear transformer circuit to obtain Galois field multiply, multiply-add, and multiply-accumulate functions of the input polynomials.

2. The compact Galois field multiplier engine of claim 1 in which said multiplier circuit includes an AND logic circuit for each term of said polynomial product to effect a Galois multiplier.

3. The compact Galois field multiplier engine of claim 1 in which said multiplier circuit includes an exclusive OR logic circuit for each pair of terms in said polynomial product to effect a Galois summation.

4. The compact Galois field multiplier engine of claim 1 in which said Galois field linear transformer circuit includes a matrix of cells each cell including an exclusive OR logic circuit, an AND logic circuit having an output connected to said exclusive OR logic circuit, and an input for receiving an input data bit.

5. The compact Galois field multiplier engine of claim 4 in which each said exclusive OR logic circuit has its output connected to the input of the next successive exclusive OR logic circuit except for the last exclusive OR logic circuit whose output is connected to the output of the matrix and the first exclusive OR logic circuit whose input is connected to a null level.

6. The compact Galois field multiplier engine of claim 1 in which said output of said Galois field linear transformer circuit is fed back to said multiplier input selection circuit and said adder input selection circuit over a local bus in said engine.

7. The compact Galois field multiplier engine of claim 1 in which said multiplier input selection circuit includes an input from said output of said Galois field linear transformer circuit and an input from said second polynomial.

8. The compact Galois field multiplier engine of claim 1 in which said adder input selection circuit includes an input from said output of said Galois field linear transformer circuit, an input from said second polynomial, and an additive identity input.

9. The compact Galois field multiplier engine of claim 1 further including a reconfigurable control circuit for supplying to said Galois field linear transformer circuit a set of coefficients for predicting the modulo remainder for a predetermined irreducible polynomial.

10. The compact Galois field multiplier engine of claim 9 in which said Galois field linear transformer circuit includes a plurality of Galois field transformer units and said reconfigurable control circuit supplies said coefficients in parallel to said Galois field transformer units.

11. The compact Galois field multiplier engine of claim 9 in which said Galois field linear transformer circuit includes a plurality of Galois field transformer units and said reconfigurable control circuit includes a plurality of reconfigurable control units one associated with each of said Galois field linear transformer units.

12. The compact Galois field multiplier engine of claim 9 in which said an additive identity is a null level.

13. The compact Galois field multiplier engine of claim 1 in which said Galois field linear transformer circuit includes a plurality of cells configured in a matrix section and a unity matrix section wherein the unity matrix section cells represent the prediction of the remainder when the output of the multiplier circuit is a polynomial with a power less than the power of the irreducible polynomial.

14. The compact Galois field multiplier engine of claim 1 in which said functions of the input polynomials are generated in one cycle.

15. A compact Galois field multiplier engine comprising:
a multiplier circuit for multiplying together two polynomials with coefficients over a Galois field to obtain their product;
a Galois field linear transformer circuit for predicting the modulo remainder of the polynomial product, the Galois field linear transformer having a multiply input from said multiplier circuit for predicting the modulo remainder of the polynomial product for an irreducible polynomial;
a first polynomial input to said multiplier circuit;
a second polynomial input; and
an adder input selection circuit for providing to an add input of said Galois field linear transformer circuit in the multiply mode an additive identity level to obtain Galois field multiply functions of the input polynomials.

16. The compact Galois field multiplier engine of claim 15 in which said multiplier circuit includes an AND logic circuit for each term of said polynomial product to effect a Galois multiplier.

17. The compact Galois field multiplier engine of claim 15 in which said multiplier circuit includes an exclusive OR logic circuit for each pair of terms in said polynomial product to effect a Galois summation.

18. The compact Galois field multiplier engine of claim 15 in which said Galois field linear transformer circuit includes a matrix of cells each cell including an exclusive OR logic circuit, an AND logic circuit having an output connected to said exclusive OR logic circuit, and an input for receiving an input data bit.

19. The compact Galois field multiplier engine of claim 18 in which each said exclusive OR logic circuit has its output connected to the input of the next successive exclusive OR logic circuit except for the last exclusive OR logic circuit whose output is connected to the output of the matrix and the first exclusive OR logic circuit whose input is connected to said adder input selection circuit.

20. The compact Galois field multiplier engine of claim 15 in which said adder input selection circuit includes an input from said output of said Galois field linear transformer circuit, an input from said second polynomial, and an additive identity input.

21. The compact Galois field multiplier engine of claim 15 further including a reconfigurable control circuit for supplying to said Galois field linear transformer circuit a set of coefficients for predicting the modulo remainder for a predetermined irreducible polynomial.

22. The compact Galois field multiplier engine of claim 21 in which said Galois field linear transformer circuit includes a plurality of Galois field transformer units and said reconfigurable control circuit supplies said coefficients in parallel to said Galois field transformer units.

23. The compact Galois field multiplier engine of claim 21 in which said Galois field linear transformer circuit includes a plurality of Galois field transformer units and said reconfigurable control circuit includes a plurality of reconfigurable control units one associated with each of said Galois field linear transformer units.

24. The compact Galois field multiplier engine of claim 15 in which said Galois field linear transformer circuit includes a plurality of cells configured in a matrix section and a unity matrix section wherein the unity matrix section cells represent the prediction of the remainder when the output of the multiplier circuit is a polynomial with a power less than the power of the irreducible polynomial.

25. The compact Galois field multiplier engine of claim 15 in which said functions of the input polynomials are generated in one cycle.

26. The compact Galois field multiplier engine of claim 15 in which said an additive identity level is a null level.

27. A compact Galois field multiplier engine comprising:
a multiplier circuit for multiplying together two polynomials with coefficients over a Galois field to obtain their product;
a Galois field linear transformer circuit for predicting the modulo remainder of the polynomial product, the Galois field linear transformer having a multiply input from said multiplier circuit, an add input and an output for combining the add input with the predicted modulo remainder of the polynomial product for an irreducible polynomial;
a first polynomial input to said multiplier circuit;
a second polynomial input said output of Galois field linear transformer circuit;
an adder input selection circuit for providing to said add input of said Galois field linear transformer circuit in the multiply-add mode said second polynomial input to obtain Galois field multiply-add functions of the input polynomials.

28. The compact Galois field multiplier engine of claim 27 in which said functions of the input polynomials are generated in one cycle.

29. A compact Galois field multiplier engine comprising:
a multiplier circuit for multiplying together two polynomials with coefficients over a Galois field to obtain their product;
a Galois field linear transformer circuit for predicting the modulo remainder of the polynomial product, the Galois field linear transformer having a multiply input from said multiplier circuit, an add input and an output for combining the add input with the predicted modulo remainder of the polynomial product for an irreducible polynomial;
a first polynomial input to said multiplier circuit;
a second polynomial input;
an adder input selection circuit for providing to said add input of said Galois field linear transformer circuit in said multiply-accumulate mode said output of said Galois field linear transformer circuit to obtain Galois field multiply-accumulate functions of the input polynomials.

30. The compact Galois field multiplier engine of claim 29 in which said functions of the input polynomials are generated in one cycle.

31. The compact Galois field multiplier engine of claim 29 in which said an additive identity level is a null level.

32. A compact Galois field multiplier engine comprising:
a multiplier circuit for multiplying together two polynomials with coefficients over a Galois field to obtain their product;
a Galois field linear transformer circuit for predicting the modulo remainder of the polynomial product, the Galois field linear transformer having a multiply input from said multiplier circuit, an add input and an output for combining the add input with the predicted modulo remainder of the polynomial product for an irreducible polynomial;
a first polynomial input to said multiplier circuit;
a second polynomial input;
a multiplier input selection circuit for providing to said multiplier circuit in the multiply mode said second polynomial and in the multiply-add mode said output of said Galois field linear transformer circuit; and
an adder input selection circuit for providing to said add input of said Galois field linear transformer circuit in the multiply mode an additive identity level and in the multiply-add mode said second polynomial input, to obtain Galois field multiply and multiply-add functions of the input polynomials.

33. The compact Galois field multiplier engine of claim 32 in which said functions of the input polynomials are generated in one cycle.

34. The compact Galois field multiplier engine of claim 32 in which said an additive identity level is a null level.

35. A compact Galois field multiplier engine comprising:
a multiplier circuit for multiplying together two polynomials with coefficients over a Galois field to obtain their product;
a Galois field linear transformer circuit for predicting the modulo remainder of the polynomial product, the Galois field linear transformer having a multiply input from said multiplier circuit, an add input and an output for combining the add input with the predicted modulo remainder of the polynomial product for an irreducible polynomial;
a first polynomial input to said multiplier circuit;
a second polynomial input;
a multiplier input selection circuit for providing to said multiplier circuit in the multiply mode said second polynomial and in the multiply-accumulate mode said second polynomial; and
an adder input selection circuit for providing to said add input of said Galois field linear transformer circuit in the multiply mode an additive identity level and in said multiply-accumulate mode said output of said Galois field linear transformer circuit to obtain Galois field multiply and multiply-accumulate functions of the input polynomials.

36. The compact Galois field multiplier engine of claim 35 in which said functions of the input polynomials are generated in one cycle.

37. The compact Galois field multiplier engine of claim 35 in which said an additive identity level is a null level.

38. A compact Galois field multiplier engine comprising:
a multiplier circuit for multiplying together two polynomials with coefficients over a Galois field to obtain their product;
a Galois field linear transformer circuit for predicting the modulo remainder of the polynomial product, the Galois field linear transformer having a multiply input from said multiplier circuit, an add input and an output for combining the add input with the predicted modulo remainder of the polynomial product for an irreducible polynomial;
a first polynomial input to said multiplier circuit;
a second polynomial input;
a multiplier input selection circuit for providing to said multiplier circuit in the multiply-add mode said output of said Galois field linear transformer circuit, and in the multiply-accumulate mode said second polynomial; and
an adder input selection circuit for providing to said add input of said Galois field linear transformer circuit in the multiply-add mode said second polynomial input, and in said multiply-accumulate mode said output of said Galois field linear transformer circuit to obtain Galois field multiply-add and multiply-accumulate functions of the input polynomials.

39. The compact Galois field multiplier engine of claim 38 in which said functions of the input polynomials are generated in one cycle.

40. The compact Galois field multiplier engine of claim 38 in which said an additive identity level is a null level.

41. A compact Galois field parallel multiplier circuit comprising:
a multiplier circuit for multiplying together two polynomials with coefficients over a Galois field to obtain their product; and
a Galois field linear transformer circuit for predicting the modulo remainder of its polynomial product for an irreducible polynomial including a plurality of cells configured in a matrix section and a unity matrix section wherein the unity matrix section cells represent the prediction of the remainder when the output of the multiplier circuit is a polynomial with a power less than the power of the irreducible polynomial.

42. The compact Galois field parallel multiplier circuit of claim 41 in which each said cell includes a programmable exclusive OR cell.

43. The compact Galois field parallel multiplier circuit of claim 42 in which said programmable exclusive OR cell includes an exclusive OR circuit and an AND circuit.

44. The compact Galois field parallel multiplier circuit of claim 41 further including a reconfigurable control circuit for supplying to said Galois field linear transformer circuit a set of coefficients for predicting the modulo remainder for a predetermined irreducible polynomial.

45. The compact Galois field parallel multiplier circuit of claim 44 in which said Galois field linear transformer circuit includes a plurality of Galois field linear transformer units.

46. The compact Galois field parallel multiplier circuit of claim 44 in which said reconfigurable control circuit supplies said coefficients in parallel to said Galois field linear transformer units.

47. The compact Galois field parallel multiplier circuit of claim 44 in which said reconfigurable control circuit includes a plurality of reconfigurable control units one associated with each of said Galois field linear transformer units.

48. A compact Galois field multiplier engine comprising:
a multiplier circuit for multiplying together two polynomials with coefficients over a Galois field to obtain their product;
a first polynomial input to said multiplier circuit;
a second polynomial input to said multiplier circuit;
a Galois field linear transformer circuit having a multiply input from said multiplier circuit and having an adder input having an additive identity level supplied thereto for predicting the modulo remainder of the polynomial product for an irreducible polynomial to obtain Galois field multiply functions of the input polynomials.

49. The compact Galois field multiplier engine of claim 48 in which said Galois field linear transformer circuit includes a matrix of cells each cell including an exclusive OR logic circuit, an AND logic circuit having an output connected to said exclusive OR logic circuit, and an input for receiving an input data bit.

50. The compact Galois field multiplier engine of claim 49 in which each said exclusive OR logic circuit has its output connected to the input of the next successive exclusive OR logic circuit except for the last exclusive OR logic circuit whose output is connected to the output of the matrix and the first exclusive OR logic circuit whose input is connected to an additive identity level to obtain Galois field multiply functions of the input polynomials.

51. A compact Galois field multiply-add engine comprising:
a multiplier circuit for multiplying together two polynomials with coefficients over a Galois field to obtain their polynomial product; and
a Galois field linear transformer circuit for predicting the modulo remainder of the polynomial product, the Galois field linear transformer responsive to said polynomial product from said multiplier circuit and a polynomial input at its add input for providing one of the polynomial inputs to said multiplier by combining the add input with the predicted modulo remainder of the polynomial product for an irreducible polynomial to obtain Galois field multiply-add functions of the input polynomials.

52. The compact Galois field multiply-add engine of claim 51 in which said Galois field linear transformer circuit includes a matrix of cells each cell including an exclusive OR logic circuit, an AND logic circuit having an output connected to said exclusive OR logic circuit, and an input for receiving an input data bit.

53. The compact Galois field multiplier-add engine of claim 52 in which each said exclusive OR logic circuit has its output connected to the input of the next successive exclusive OR logic circuit except for the last exclusive OR logic circuit whose output is connected to the output of the matrix and the first exclusive OR logic circuit whose input is connected to a second polynomial input to obtain Galois field multiply-add functions of the input polynomials.

54. A compact Galois field multiply-accumulate engine comprising:
a multiplier circuit for multiplying together two polynomials with coefficients over a Galois field to obtain their polynomial product;
a first polynomial input to said multiplier circuit;
a second polynomial input to said multiplier circuit;
a Galois field linear transformer circuit for predicting the modulo remainder of the polynomial product, the Galois field linear transformer responsive to said polynomial product from said multiplier circuit, and a polynomial add input for combining the add input with the predicted modulo remainder of the polynomial product for an irreducible polynomial to obtain at an output Galois field multiply-accumulate functions of the input polynomials; and
said output providing a polynomial to said add input of said Galois field linear transform circuit.

55. The compact Galois field multiply-accumulate engine of claim 54 in which said Galois field linear transformer circuit includes a matrix of cells each cell including an exclusive OR logic circuit, an AND logic circuit having an output connected to said exclusive OR logic circuit, and an input for receiving an input data bit.

56. The compact Galois field multiply-accumulate engine of claim 55 in which each said exclusive OR logic circuit has its output connected to the input of the next successive exclusive OR logic circuit except for the last exclusive OR logic circuit whose output is connected to the output of the matrix and the first exclusive OR logic circuit whose input is connected to said output of said Galois field linear transformer circuit to obtain Galois field multiply-accumulate functions of the input polynomials.

\* \* \* \* \*